March 13, 1951     F. C. WALRAVEN     2,545,180
ORTHOPTIC INSTRUMENT
Filed Aug. 15, 1949
*Fig. 1*
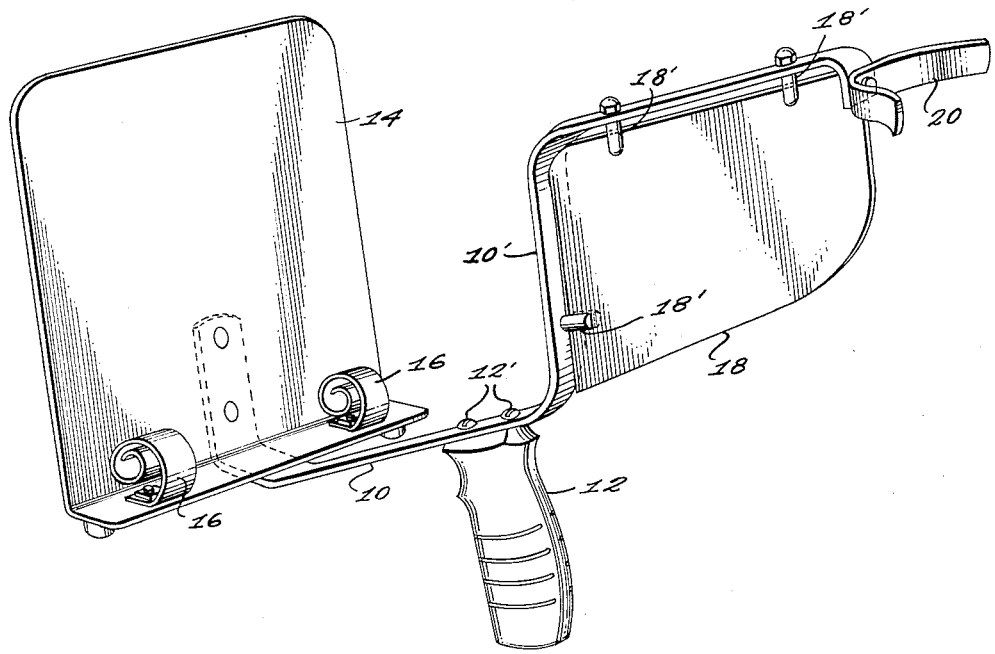
*Fig. 2*
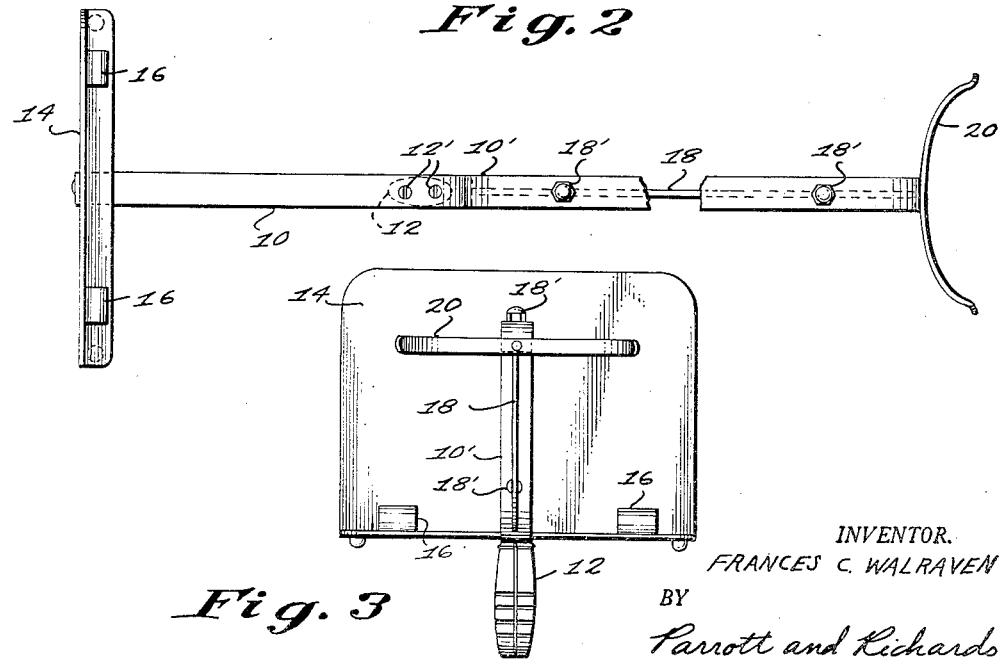
*Fig. 3*
INVENTOR.
FRANCES C. WALRAVEN
BY
Parrott and Richards
ATTORNEYS Patented Mar. 13, 1951

2,545,180

UNITED STATES PATENT OFFICE 2,545,180

ORTHOPTIC INSTRUMENT

Frances C. Walraven, Atlanta, Ga.

Application August 15, 1949, Serial No. 110,360

3 Claims. (Cl. 128—76.5)

This invention relates to orthoptic instruments, and more particularly to an improved instrument of this class adapted for training defective eyes for single binocular vision.

There are various causes for lack of binocular vision. One such cause is known as strabismus. When strabismus is present, the eyes do not have parallel alignment and cannot focus both eyes on the same object at the same time. An eye may deviate either in, out, up, or down. In convergent strabismus, the deviation is inward and in divergent strabismus, the deviation is outward. In hypertropia the deviation is up. Another such cause is known as amblyopia, which is a condition in which an eye has not developed for one reason or another so that it is not used normally. An undeveloped eye of this sort results in the afflicted person using only a single eye with consequent impaired vision that cannot be corrected by glasses. Still another somewhat similar eye defect is known as suppression where, either consciously or subconsciously, a person uses only one eye so that while the eye not used may be fully developed, the effect on the vision is the same as that present in amblyopia.

In order to correct or train eyes to overcome these and similar defects so as to obtain normal binocular vision, it is necessary to develop bi-macular fixation. Bi-macular fixation is the simultaneous focusing of the macular or central area of the eyes on an object so that fusion of the two object images is obtained, which is essential for normal binocular vision. In order to develop single binocular vision or bi-macular fixation, the eyes must be trained to focus simultaneously so that the above noted fusion of the object seen is obtained. The orthoptic instrument of the present invention is uniquely adapted for this purpose.

The orthoptic instrument of the present invention is constructed for use as a hand instrument by a particularly trained examiner and is arranged so that the examiner is allowed full observation of a patient's eyes for watching and correcting false movements. The instrument is further arranged to position a patient's eyes at a normal reading distance from orthoptic exercise material, and includes an improved means for obstructing complete vision of the exercise material as a whole except by binocular vision.

An embodiment of the orthoptic instrument of the present invention is illustrated in the accompanying drawing, in which:

Fig. 1 is a perspective view of an orthoptic instrument constructed in accordance with the present invention;

Fig. 2 is a top plan view of the instrument shown in Fig. 1; and

Fig. 3 is a right end elevation corresponding to Fig. 2.

Referring now in detail to the drawing, the orthoptic instrument of this invention, as shown, comprises a frame structure 10, suitably formed of a light metal, such as aluminum, or of a plastic material, so that the instrument may be handled easily. This frame structure 10 is fitted with a depending handle 12 secured in place by screws or the like as at 12', and by which the instrument may be held conveniently in proper position during use. If desired, the handle 12 may be pivotably mounted on the frame structure 10 by any suitable means (not shown) so that it may be collapsed when not in use.

A vertical rack member 14 is disposed transversely at one end of the frame structure 10 for supporting orthoptic exercise material, clip elements 16 being arranged on the rack member 14 for securing the exercise material in place. Also disposed on the frame structure 10 is a vertical partition 18 arranged longitudinally on the frame structure 10 centrally and in fixed spaced relation with respect to the rack member 14. The frame structure 10 may be advantageously formed as shown in the drawing to extend upwardly at the front edge of the partition 18 and then rearwardly along its top edge to receive studs fixed on the partition 18 as at 18' for attachment to the frame structure 10.

A headrest 20 is arranged on the vertical partition 18 at the end thereof remote from the rack member 14, and the fixed spacing of the partition 18 from the rack member 14 is such that this headrest 20 positions a patient's eyes at a normal reading distance from exercise material supported by the rack member 14. The headrest 20 is also arranged to dispose the patient's eyes in line with the exercise material and with the line of vision from each eye separated by the vertical partition 18, and to prevent the patient from moving his head to compensate for defective binocular vision.

In the embodiment shown in the drawing, the form of frame structure 10 includes a relatively narrow bar portion 10', arranged transversely at the vertical edge of the partition 18 adjacent the rack member 14, although this bar portion 10' might be provided as a separate element if it were desired to form the frame structure otherwise. In any case, the bar portion 10' is provided in a width sufficient to obstruct complete vision of the exercise material separated on the rack member 14 except by single binocular vision. This arrangement makes the patient conscious of the fact when his eyes are not being used together for single binocular vision, and the above described arrangement of the headrest 20 provides for complete unobstructed observation of the patient's eyes by the examiner so that the patient may be watched and helped to overcome the defect which the bar member 10' calls to his attention.

In an actual embodiment of the orthoptic instrument of the present invention now in successful use, the instrument has been constructed so that the headrest 20 positions the patient's eyes at a distance of about 13 inches from the vertical rack member 14, which corresponds with what is generally considered a normal reading distance, and the vertical partition 18 extends forwardly from the headrest 20 for about 7 inches with a bar portion 10' of about ½ inch in width arranged at its forward end, which leaves the rack member 14 spaced to support the exercise material at about 6 inches from the bar portion 10'.

As previously pointed out, the purpose of the partition 18 is to separate the line of vision from the patient's eyes, and requires binocular action if the exercise material is seen on both sides of the member 18 at the same time. The purpose of the bar portion 10' is to provide an obstruction by which the patient is forced to employ single binocular vision in order to see the complete exercise material supported on the rack member 14. To accomplish these purposes, the above noted dimensions or proportions will be found to be optimum. In this connection the fixed spacing of the forward edge of the partition 18 from the rack member 14, and the width of the bar portion 10' arranged at the forward end of partition 18 are of critical importance, because if the rack member is positioned too close to the partition 18, or the bar portion 10' is too wide, binocular vision will be impossible regardless of the condition of the patient's eyes, while if the rack member 14 is spaced too far away or the bar portion 10' is not wide enough it will be possible to read exercise material on the rack member 14 with only one eye. The fixed spacing of the rack member 14 from the forward edge of the partition 18 and the bar portion 10' in accordance with the present invention is also important in that it allows adequate clearance for use of a pencil or the like by the patient for drawing or writing on exercise material supported on the rack member 14 and thereby provides for development and training of coordination between the hands and eyes of the patient.

I claim:
1. An orthoptic training instrument for training defective eyes for single binocular vision comprising a frame structure, a vertical rack member disposed transversely on said frame structure for supporting orthoptic exercise material, an upright and relatively narrow bar portion formed integrally with said frame structure, said bar portion being arranged in parallel spaced relation to said rack member, a vertical partition fixed on said frame structure and disposed adjacent said bar portion to extend oppositely from said rack member but centrally and at right angles with respect to said rack member, and a headrest supported on said partition at the end thereof remote from said rack member, said headrest being disposed to position a patient's eyes at normal reading distance from said rack member with the line of vision separated by said partition, the spaced relation of said bar portion with respect to said rack member and the width of said bar portion being such that complete vision of exercise material on said rack member can be had only with single binocular vision.

2. An orthoptic training instrument as defined in claim 1 and further characterized in that said headrest is disposed to position a patient's eyes at about 13 inches from said rack member, said bar portion is spaced about 6 inches from said rack member, and the width of said bar portion is of the order of ½ inch.

3. An orthoptic training instrument as defined in claim 1 and further characterized in that said headrest comprises an arcuate band adapted to receive the patient's forehead whereby the examiner may have complete unobstructed observation of the patient's eyes.

FRANCES C. WALRAVEN.

REFERENCES CITED

The following references are of record in the file of this patent:

UNITED STATES PATENTS

| Number | Name | Date |
|---|---|---|
| 910,087 | Richmond | Jan. 19, 1909 |
| 1,948,901 | Brombach | Feb. 27, 1934 |